United States Patent
Da Silva Baptista Russo et al.

(10) Patent No.: US 11,256,486 B2
(45) Date of Patent: Feb. 22, 2022

(54) METHOD AND COMPUTER PROGRAM PRODUCT FOR AN UI SOFTWARE APPLICATION

(71) Applicant: Hitachi Vantara LLC, Santa Clara, CA (US)

(72) Inventors: Carlos Manuel Da Silva Baptista Russo, Lisbon (PT); Duarte Maria Elias Da Costa Da Cunha Leão, Alcabideche (PT); Guilherme Coelho Barreira Raimundo, Oeiras (PT); Marco Paulo De Sousa Correia Vala, Oeiras (PT); Nelson Diogo Almeida Antunes, Amadora (PT)

(73) Assignee: HITACHI VANTARA LLC, Santa Clara, CA (US)

( * ) Notice: Subject to any disclaimer, the term of this patent is extended or adjusted under 35 U.S.C. 154(b) by 61 days.

(21) Appl. No.: 16/774,064

(22) Filed: Jan. 28, 2020

(65) Prior Publication Data
US 2021/0232372 A1 Jul. 29, 2021

(51) Int. Cl.
*G06F 8/38* (2018.01)
*G06F 8/65* (2018.01)
*G06F 8/34* (2018.01)
*G06F 8/35* (2018.01)

(52) U.S. Cl.
CPC .............. *G06F 8/38* (2013.01); *G06F 8/34* (2013.01); *G06F 8/35* (2013.01); *G06F 8/65* (2013.01)

(58) Field of Classification Search
CPC .............. G06F 8/34; G06F 8/35; G06F 8/65
See application file for complete search history.

(56) References Cited

U.S. PATENT DOCUMENTS 7,114,127 B2 * 9/2006 Weitzman ............... G06F 8/10
715/700

OTHER PUBLICATIONS

Karwchan,"Redux Vs. MVC, Why and How?",Feb. 22, 2017,pp. 1-9 (Year: 2017).*
Pasquier, "How to integrate Redux in your MVVM architecture", Dec. 9, 2019,pp. 1-9 (Year: 2019).*

* cited by examiner

*Primary Examiner* — Duy Khuong T Nguyen
(74) *Attorney, Agent, or Firm* — Mattingly & Malur, PC

(57) ABSTRACT

A computer program product comprising computer-readable instructions that, when executed in a computer system including one or more computers, cause the computer system to generate or update a user interface of a software application, the computer program product including programmably interconnected objects, said objects including one or more model objects, one or more view objects, and one or more controller objects, wherein each model object is interconnected for data exchange with one or more view objects and/or with one or more controller objects; and each model object includes one or more sub-model objects including hierarchically structured data and representing a state of the user interface; and each view object is associated with at least one model object or at least one sub-model object and configured to generate the user interface or update the user interface in accordance with a change of the state.

11 Claims, 7 Drawing Sheets

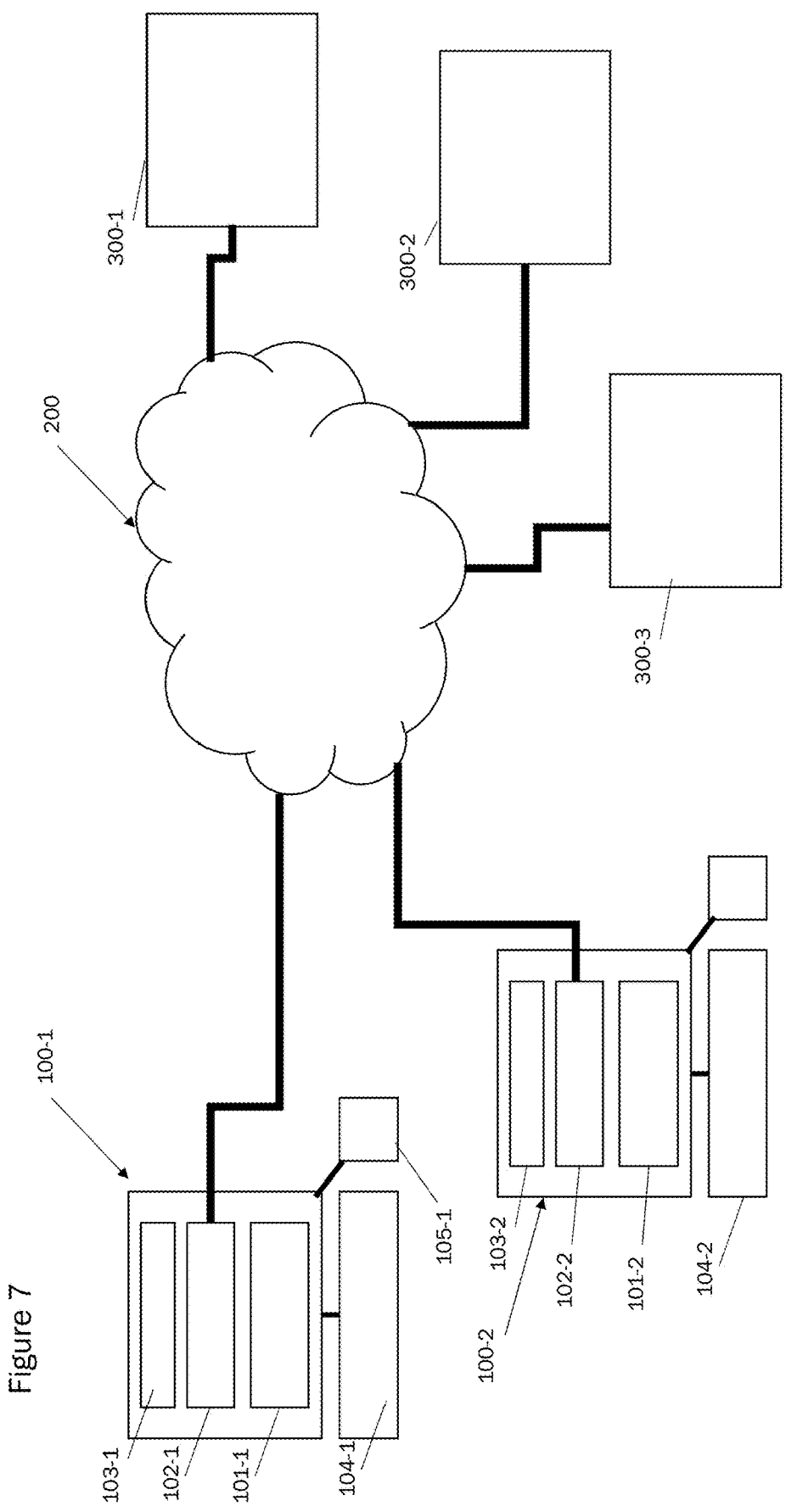

METHOD AND COMPUTER PROGRAM PRODUCT FOR AN UI SOFTWARE APPLICATION

The present disclosure relates to methods and computer program products for generating/updating the UI of a UI software application(s).

BACKGROUND

A Graphical User Interface (GUI) software application may continuously update a representation of the software application state, whenever said state changes. A state may change in response to a user interaction with the user interface (UI) or in response to another external signal. A graphical user interface software application is a specific example of a user interface software application in general. The user may interact with other types of user interfaces, e.g., by way of haptic stimulus of the user, audio stimulus of the user, or the like.

A typical UI software application can handle many responsibilities which may include: Read a state from a persistent storage including de-serialize the state; hold a state in memory including, for example, the state of an opened document, the state of got data, or the state of UI elements, such as toolbar positions and scroll positions, and record the state history, for undo/redo functionality; write the state to persistent storage including serialize non-transient state; interface with the user including render an interactive graphical representation of the application state, and re-render whenever the software application state changes; react to user input by translating it into action message objects; behavior and business Logic customization including validate user input, in the form of action messages, handle action messages, by applying business logic which converts these into either side-effects or changes to the software application state, and allow third parties to customize the behavior and business logic, for example, to meet the user's personal preferences or the business rules of a corporation; and extensibility including standardize software application programming interface (APIs) for use by plugin modules, and facilitate the interoperability with other technologies and architectures.

It is desired to implement an UI software application that provides all of the above properties, especially including the more advanced ones, such as behavior and business logic customization, as well as extensibility and interoperability with other technologies and architectures.

Different software architectures for user interface software applications are already known. For example, the Model-View-View Model (MVVM) architecture is a modification of a Model-View-Controller (MVC) architecture. In the MVVM architecture, view objects (briefly: view/s) and model objects (briefly: model/s) do not know each other and are programmably connected via so called "bindings". Bindings connect parts of a model to parts of a view and can, essentially, be unidirectional and changes to the model may update the view. Bindings in the MVVM architecture can also be bidirectional which means that changes to the view update back the model. Control can be exerted by listening to change events of the model objects. By itself, the MVVM architecture provides no clear path for extensibility nor for control coordination. Additionally, there's no uniform notion of mutation nor the ability to centrally and generically modify what is going to be mutated from within a change event. Frequently, change events can only be cancelled in the MVVM architecture. Together, these characteristics result in controllers being scattered across models and in views which start being updated before the models have stabilized due to cascading changes and controls. This type of control and data flow is hard to reason about, debug and test. Hence, MVVM architectures have an inherent complexity which is often undesired.

Another type of architecture which applies a different "state store", which shall be understood as a single root model object preferably, is a variation of the MVC architecture, too. Sometimes this architecture is called "Uni-flow Architecture" employing a "uni-flow state store". This uni-flow architecture is implemented by known libraries, such as Redux and Flux. They are designed to work mostly within a unidirectional data flow architecture, for which a typical working example is as follows:

1. Action messages are dispatched to the state store.
2. The state store's controller (called a "reducer") processes the dispatched action messages by determining the new state of the state store.
3. The state store emits a "changed" event.
4. The view listens to the state store's "changed" event and re-renders in response.
5. The view translates user gestures into new action messages, dispatched to the state store.

The unidirectional data flow cycle is closed. The unidirectional flow makes it easier to reason about the behavior of the software application than the MVVM architecture. Testing is also less cumbersome with the uni-flow architecture. Typically, no direct references are held to a part of the state. Instead, a reference to the state store is kept and paths, called "selectors", are used to access parts/elements of the state. The fact that there is a single "change" event causes views to update all at the same time—at a time when all of the consequences of dispatching an action have been had. A single controller is associated with the state store. In other words, the uni-flow architecture owns some simplicity and functional style.

Notable differences between the uni-flow architecture and the MVVM architecture include:
a. State is concentrated within a state store.
b. There is a single way and point of entry for causing mutations: dispatching an action message to the state store.
c. There is a single controller, called a "reducer".
d. There is a single state "changed" event.

However, there are technical issues to be addressed associated with the uni-flow architecture, too. Parts of state may lose their identity. State is assumed to live in a closed, fixed, world, known a priori—there's no simple way to extend the structure of state or control with those of plugged-in modules; internal or from external parties. There's also no simple and general way to compose state stores, nor to integrate with components which follow different state management paradigms. In other words, there is a desire to improve especially modularity, composition and extensibility of the uni-flow architecture which maintains simplicity and unidirectional data flow.

Further points of desired improvement of the uni-flow architecture include that action messages are dispatched to the state store, the root, and then need to be internally dispatched to the actual target nodes/subtrees; this goes against modularization, abstraction, composability. Further, there's no ad hoc way to know the state changes to a certain level detail; it requires performing a tree difference operation with the previous state, every time. Further, the uni-flow architecture gives rise to boilerplate code needed to handle untyped objects, for building state objects and action messages. And, further, it may lead to scattered, harder to get information about the complete structure of state or action messages.

Problem and Solution

It is hence an object of the herein described disclosure to provide a solution which, in particular, allows to compose and extend state and control, while keeping a unidirectional data flow and using an object-oriented approach. The appended claims provide a solution and in particular they provide a technically improved MVC architecture which will be called "specialized MVC architecture" (briefly: sMVC architecture).

In particular the appended claims may include a computer program product for generating or updating a user interface of a software application including interconnected objects. The term programmably shall in particular be understood that an interface between the objects is provided which links them by way of programmed code/software. The objects may be programmed code and may also be considered as software modules.

Said objects may comprise one or more model/state objects (briefly: model), one or more view objects (briefly: view), and/or one or more controller objects (briefly: controller), wherein each model object may be interconnected for data exchange with one or more view objects and/or with one or more controller objects. Preferably, each model object is connected to a plurality of view and controller objects, respectively. Each model object may include data representing a state of the software application which may be shown/depicted/visualized/reproduced by an associated view object.

Each model object may include one or more sub-model objects including hierarchically structured data and representing a state of the user interface. Further, if a model object is considered to be an instance of a complex data object, and if its properties all contain simple data objects or lists of simple data objects, then a model object may have only sub-data-objects. The state of the user interface can change due to any variation, alteration, modification, update or the like of the software application, especially any variation, alteration, modification, update or the like of the user interface software application. A modification may especially take place after/due to a user input or another external signal.

Further, each view object may be associated with at least one model object or at least one sub-model object and configured to generate the user interface or update the user interface in accordance with a change of the state. Further, each controller object may be associated with at least one model object or at least one sub-model object and configured to execute control of said associated model object or sub-model object. The term "associated" may in particular indicate, e.g., that an associated controller object may control the specific associated model object or that an associated view object may display the state of the model object associated therewith.

The problem of providing a flexible solution for a software application, especially a user interface software application, to compose and extend state and control, while keeping a unidirectional data flow and using an object-oriented approach is solved by the above aspects. In particular, the different objects can be flexibly linked with each other, e.g. external parties can provide controller modules for already previously existing model objects or alternative view objects can be associated with model object(s). Multiple associations between the objects are possible. The data within the models is structured. The best of a MVVM architecture and a uni-flow architecture can be combined and an improved architecture is achieved.

Further, the data exchange between a view object and a model object may be unidirectional which may, for example, mean that the model object is not altered due to a modification of view object. Further, "unidirectional data flow" may be understood that data flow from the model to the view and action messages flow from the view to the model. Additionally, all consequences of control, in response to an action message, may be evaluated before any change (of state) notifications are issued. Accordingly, the objects, views and/or controllers may be configured/programmed to act in accordance with the unidirectional data flow principles.

This allows inheriting the uni-flow architecture's technical advantages into the herein proposed sMVC architecture. However, as exceptions, views may be enabled to always break an otherwise unidirectional flow by dispatching an action message to the object store which is not the direct result of the user interacting with it, such as when starting a server query in response to a re-render.

Further, the data of the model object may be hierarchically structured according to or into different (data) classes. The classes provided for the model object according to the present disclosure, in particular, may include a complex data class, which may preferably represent a structured value with zero, one or multiple properties, or a list class which may preferably combine zero, one or more data elements. The case of having zero properties may serve as an abstract concept for further sub-classing.

Further, the computer program product, preferably the model objects, the view objects and the controller objects, may include application programmable interface (data) objects (alternatively called "contract data objects"; abbreviated as "API data objects"). The API objects may include predefined action message (objects); and, in more detail, predefined or derived action messages and/or action executions. The action messages may provide technical functionality for exerting precise and defined control of an object, for requesting something from one object by another object, for issuing notifications from one object to another, and the like.

Further, a model object which has received an action message from an associated view object or controller object may be configured to execute a requested action in accordance with the action message following a predefined order of action phases. Preferably, the first action (execution) phase is "init" including the state "init", the second action (execution) phase is "will" including the state "will", the third action (execution) phase is "do" including the state "do" and the fourth (execution) action phase is "finally" including the states "did", "cancelled" and "failed". The way of handling an action message in accordance with a predefined cycle of phases allows improved control of the execution, e.g., the stopping/cancelling of an action is enabled during well-defined phases of the cycle, further, each phase may have a clearly defined "task" which provides clearly defined process and data flow avoiding, e.g., the drawbacks of MVVM architecture described above.

Moreover, a further aspect of this sMVC architecture bridging the known object-oriented and the explicit "action execution" paradigms preferably comprises API of complex and list objects masquerading the creation of mutation action messages and their execution. This is done by calling to "act" (act method) with regular add, remove, move, insert, set helper methods or other helper methods.

The execution of the requested action follows the predefined order of action execution phases with its states. For example, during the "init"-phase the execution of the requested action can (still) be changed by another action request or the requested action can be cancelled. During the "will"-phase it may be validated as to whether the required action is (technically) executable/feasible and the requested action may be (automatically) cancelled if not. During the "do"-phase the required action, as defined during the "init" and "will" phases before, may be executed or can (still) be cancelled. During the "finally"-phase the execution results may be processed by the hardware controlled by the herein described computer program product. Further, the model object executing the required action may be configured to emit a state-notification to the associated one or more controller(s) or to the view object(s) so that the phase is always known to the/these object(s).

Further, action messages may be structured into or according to (sub) classes including mutation actions and generic actions. A mutation action may be configured to execute changes to a target sub model object or a model object, and to sub model objects or model objects which are interrelated with the target sub model object or model object. Preferably, multiple mutation actions are executable at the same time as a transaction. The provision of mutation actions allows a phenomenon taking place within the hierarchically structured data of the model object which is called "bubbling". A state change may move up to the root model object from a lower sub-model object affecting all (parts of) connected model object(s). The "bubbling" process of mutation action messages enables that the sMVC architecture or the model can listen to mutations action messages of contained/nested state objects centrally. This further allows exerting control centrally, even over unknown sub-objects which may be included, e.g., due to third-party extension(s) of the model.

Moreover, within the herein described architecture generic actions may have custom semantics and/or may exhibit/have an asynchronous "do" phase. Even further, mutation actions and generic actions may be handled uniformly using a common entry-point, preferably the "act" (act method) and/or a base execution life-cycle, such as the action execution cycle described in the aspect above, and/or execution "state" listening capabilities which are realized by respective programming of the objects, etc.

Further preferably, the model can be configured/programmed so that mutation actions occurring during the "init" of an initial mutation action can be configured to join an implicitly created or a pre-existing transaction.

Further, preferably, the sMVC architecture may be configured/programmed additionally so that a transaction can be put aside, in other words it can be removed from being "current". Preferably, the putting aside can be timed for as long as desired or programmably predefined. This configuration of putting aside a transaction may relate, especially, to all of the (captured) changesets/action messages. As soon as it is "desired", e.g. indicated by a user, a transaction may be set as "current" again and applied/executed. This may preferably succeed as long as no changes have occurred to the (affected) objects in between. The technical advantage/use of this "putting aside" is performing change simulations in which changes are performed, then the "init" and "will" phases are run only, then the validation is run and a roll back, i.e. remove the transaction from "current" which may mean not applying it. This can be used for UIs for discovering valid actions that a user can take. Because simulated states are never "committed", the "do" state and "finally" phase events are never emitted and controllers or views listening to these events are not notified. Hence, it is not necessary to recreate the entire model object graph, with appropriate listeners, for each simulation and then discard it each time.

Further, the view objects are configured to apply a common graphical programming language so that a high flexibility is enabled in regard of the programming language being used for different views. Further, each view object may be configured to either generate the entire user interface upon a state change or to update a (relevant) part of the user interface upon a state change. This is also described as rendering paradigm of the view objects. Also, the controller objects may apply different paradigms in analogy to the above described view objects. Flexibility is further improved by the variety of configurations of the objects.

The controller objects may include listener objects configured to listen to state-notifications emitted by an associated model object so that respective actions possible during the different phases can be controlled precisely. The control objects may be configured to specify either an entire final state of a mutation action or a part of the final state of a mutation action which can be understood as mutation paradigm of the controller objects in analogy to the rendering paradigm described for the view objects above.

Moreover, preferably, views may also be configured/programmed, like the controller(s), to react to state changes via listener objects that listen to specific events, such as a "change:did" event.

In addition to the above aspects, the computer program product comprising computer-readable instructions that, when executed in a computer system including one or more computers, cause the computer system to generate or update a user interface of a software application, may be composed alternatively: Specifically, especially in a testing environment, the model object may not be connected to a view or controller object so that the model object itself can be tested. The model object being in particular preferably configured to inherit the configuration of a unidirectional data flow handling and an object-oriented composition/setup. The alternative aspect of the computer program product including programmably interconnected objects, may have objects comprising at least one model object, and each model object may have one or more sub-data objects and/or one or more sub-model objects including hierarchically structured data and representing a state of the user interface. As mentioned above, this aspect without views or controllers can be useful for unit-testing models.

Further, the model object may be connected with a controller object which is programmed/configured to act as a view object. Such a special controller may be used to replace a "view" by causing an external side-effect, e.g. opening a browser window to content external to the application. In other words, such special controller could be should considered as a view.

Further, the computer program product of at least one above the above aspects may be installed on a computer, a server and/or distributed computing resources/storage spaces. A herein entailed method carried out by a computer program product according to at least one the above aspects further may generate or update a user interface of a software application.

While certain exemplary aspects have been described above, it is to be understood that such aspects are merely illustrative of and are not restrictive on the broad disclosure herein, and that the exemplary aspects are not limited to the specific constructions and arrangements shown and described above, since various other changes, combinations, omissions, modifications and substitutions, in addition to those set forth in the above paragraphs, are possible.

Those skilled in the art will appreciate that various adaptations, modifications, and/or combination of the just described aspects can be configured. Therefore, it is to be understood that, further aspects may be practiced other than as specifically described herein. For example, unless expressly stated otherwise, the steps of processes described herein may be performed in orders different from those described herein and one or more steps may be combined, split, or performed simultaneously.

Those skilled in the art will also appreciate, in view of this disclosure, that different aspects described herein may be combined to form other aspects of the present disclosure.

Summarizing, the present disclosure neatly combines aspects from both the MVVM architectures and the uni-flow architecture to provide the best of both worlds. It is one aspect to achieve unidirectional data flow in the herein proposed sMVC architecture that mutation actions and transactions for grouping these are used serving as a workspace for controllers. A certain number of control iterations can occur, crossing several levels of a hierarchy of state objects, and spanning multiple unconnected object graphs, until the consequences of an initial set of mutations stabilize. Only then, views may be notified of the final, stable, consistent mutations. Transactions are "global"—when a transaction is active, it encompasses all objects, whether these are connected or not. When the transaction's changes are accepted, then all views are notified at the "same time". The enforced ordering of "mutation then control then view" is a backside of unidirectional data flow.

BRIEF DESCRIPTION OF DRAWINGS

FIG. 7 schematically shows a computer system which implements the specialized MVC architecture according to exemplary embodiments.

DETAILED DESCRIPTION OF EXEMPLARY EMBODIMENTS

Figure 1:
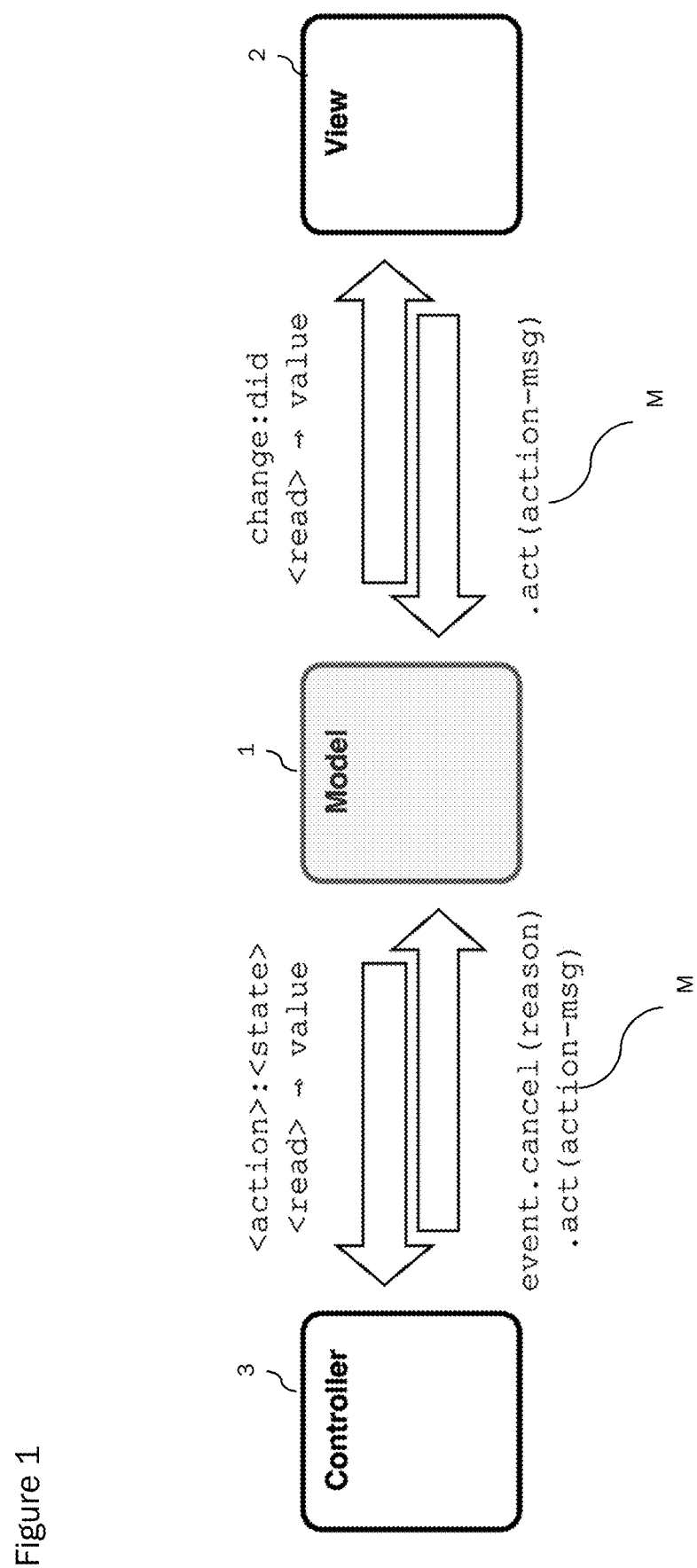
FIG. 1 schematically shows a specialized MVC architecture according to exemplary embodiments.

In the following, preferred aspects and embodiments will be described in more detail with reference to the accompanying figures. Same or similar features in different drawings and embodiments are referred to by similar reference numerals. It is to be understood that the detailed description below relating to various preferred aspects and preferred embodiments are not to be meant as limiting the scope of the present disclosure.

A schematic of a specialized Model-View-Controller (sMVC) architecture according to the present disclosure is illustrated in FIG. 1 that shows a model object (1) interconnected with a controller (3) and a view object (2), respectively. For simplicity of the Figure, the model object (1) is shown interconnected with a single controller object (3) and a single view object (2) only. However, the/each model object (1) can have multiple views (2) and controllers (3) although only one is represented in FIG. 1. A unidirectional data flow preferably exists between the model (1) and the view (2). The model (1) of the sMVC architecture is an object-oriented state store. In other words, the software application contains a single root state/model object (1) which is called the "state store" in the following and above. In even other words, a part of a state object is either an atomic value or another state object. A state object is either a Complex or a List. "Model" is the role played by state objects in the context of the MVC architecture and in particular the sMVC architecture disclosed herein.

The sMVC architecture is especially applicable for structuring UI software applications, and it allows splitting responsibilities across the three main software modules/objects that were introduced above:

The model object (1) (briefly: model) is, in particular, responsible for in-memory state representation and management;

the view object (2) (briefly: view) interfaces with the user, and the controller object (3) (briefly: controller) is, in particular, responsible for behavior and business logic.

The different objects are storable in a hardware memory/storage and a hardware processing unit may be configured to execute the computer program product stored in the hardware storage. The hardware storage may be included in a local computer, it may be distributed over different hardware storage units and/or it may be provided remotely, e.g. via an internet-based data cloud or the like.

As already noted above, the herein described specialized Model-View-Controller architecture makes use of an object-oriented state store that plays the model role, to constrain, abstract and guide the interaction between controller (3) and view modules/objects (2) including: enabling controllers (3) and a views (2) to use different state-management paradigms, and providing the means to delegate control to third parties. The state of the software application/user interface of the software application (briefly: "state") is represented using an object-oriented approach. Each part of the state (or of a "state part") may be an instance of a predefined data class. By composing state parts, it is possible to represent hierarchical data structures. Relevant data classes included in the herein described sMVC architecture which may be used for building said architecture are described in detail further below.

The Model (1) being applied in the herein described sMVC architecture is now described in the following.

Model/State Representation and Management

Cross-cutting capabilities such as state validation, state serialization (and de-serialization) and state metadata can be described in the sMVC architecture specifically and concisely by taking advantage of the generally known principles of object-oriented programs, such as inheritance of an object or of a class, and polymorphism.

Mutation of a state here is achieved, directly or indirectly, by the objects being programmed to be able to dispatch action message(s) (M), which shall be preferably understood as i.a. control signals exchanged between the objects of the architecture, to target state objects. Actions are executed in a target object by calling so-called "act method" (see e.g. table 2 below) with an action message as argument. An action message represents the intention of performing an action, in the way described in the message, having a specific state object as its target (depending on the semantics of the action, the target object is the patient or the agent of the action). An action can be a mutation action (MA) or a generic action (MG). Mutation actions are configured to be primitive and atomic. Each mutation operation which can be performed to a state object has a corresponding mutation action. The ultimate result of executing a mutation action is fixed and is actually performing the described operation. Generic actions represent higher-level operations and are specific to the problem domain. Their execution can result in the execution of other actions and even the causing of external side-effects. Depending on their semantics, generic actions may have a natural default operation, which is performed in case the action is not cancelled or marked done (see below). Otherwise, the result of the execution of a generic operation is completely determined by listening controllers (see below).

In the sMVC architecture the execution of an action, in a target state object/part, goes through a predefined lifecycle which preferably includes the phases (P1 to P4): init, will, do and finally. Each phase configured to serve a different purpose. Within phases there are execution states (S1 to S4). For each lifecycle state, a corresponding event, carrying the associated action message (M), is emitted in the target state object.

A controller (3) or a listener object within the controller (3) listens to lifecycle state events (phase notifications) in order to:
 a. change the exact way in which an action will be executed (in the init state),
 b. validate if an action can be executed, canceling the execution if not (in the init, will and/or do states),
 c. for generic actions, execute an action, proper (in the do state), and
 d. apply related business logic, according to the outcome of the action execution (in one of the finally phase's states).

The execution of mutation actions (MA) is special. When a mutation occurs in a nested/grouped state object, it is like the container state object is being mutated as well, although to a lesser extent. To match the semantics of hierarchical mutations, their execution in a target state object causes the execution of corresponding mutation actions in each of the containing state objects, up until the root state objects. This mechanism is loosely called bubbling. The mutation action messages end up forming a hierarchy which mirrors the hierarchy of state objects. By listening to a lifecycle state event of the execution of a mutation action (MA), a controller (3) or view (2) can determine what is changing (or has been changed) to the desired level of detail. While some might only need to know whether the value of a property, for example, "data", has changed or not, others may need to know in which way it has changed: "which rows were added?" and "which were removed?". This, preferably, achieved by programming/providing an algorithm which may be especially used for mutations done on List state objects (5). For Complex state objects (4), it may be achieved as the mutation of each known property to its new, given value. For List objects (5), there are multiple ways to perform (atomic) mutations which takes it to a final state. The preferred algorithm uses the following principles: In a nutshell, the list elements of the given final state are classified according to: added, removed, preserved. Amongst the preserved elements, the content of each given element is used to serve as the desired final state of the existing element (applying the algorithm recursively, when elements are complex). Additionally, it is determined if preserved elements have changed their position in the list. Then, (atomic) mutations are added to perform each of the additions, then each of the removals and, lastly, each of the moves.

It is sometimes needed that the state store assumes a new internal state, whose distance to the current state is greater than a single mutation. The problem of determining a sequence of mutations which takes a state store from any one internal state to any other internal state, generally, has multiple solutions. This disclosure's state store can automatically determine a (not necessarily minimum) sequence of mutation action messages (M) which takes it from its current internal state to a desired final internal state. Multiple mutation actions (MA) can be executed together, in a single, coordinated execution which is called a transaction (T). This capability is particularly technically beneficial, for several reasons:
 a. prevents consecutive finally state events, which would, typically, translate into costly, consecutive UI updates;
 b. ensures that mutation action controllers are given a view of the whole set of logically related changes, thus skipping any intermediate steps of invalid/inconsistent state;
 c. ensures that controllers can effectively modify what is really going to be mutated, in an init state event, by adding or removing mutations which are all executed in the same, original batch;
 d. ensures that a sequence of mutation actions, which is determined to be required to achieve a certain final state, can be executed atomically; and, finally,
 e. ensures that either all of the mutations are made, or none are.

Figure 2:
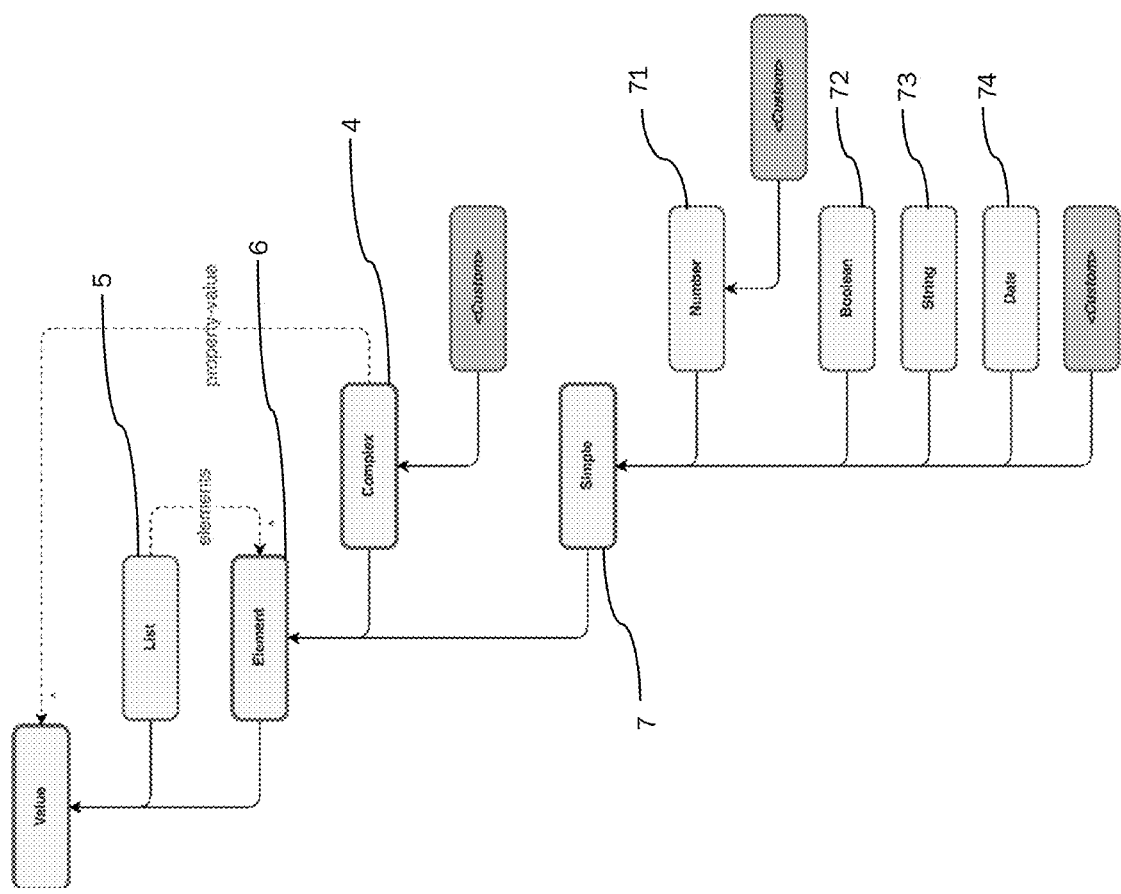
FIG. 2 schematically shows a class hierarchy of state objects according to exemplary embodiments.

In view of FIG. 2, additional details are now described with regard to properties of the model: As mentioned above, state values may be instances of data classes, in particular instances of one of the data classes presented in FIG. 2. In particular, FIG. 2 presents a class hierarchy of state objects preferably used in the context of the present disclosure. State objects or models (1) can be instances of (a subclass of) either the Complex (data) class (4) or the List (data) class (5), although root models are always complex values.

The abstract Complex class (4) represents a structured value which has "named properties", whose values are instances of (a subclass of) "Value" (see FIG. 2), or the special empty value, "null". Sub-classes of the Complex class (4) can define specific properties and override ones from the base class. The value of a property can be a List class (5), for a multi-valued property, or an Element class, for a single-valued property. In other words, the abstract Element class (6) represents single values. An element (6) can be complex, i.e. structured, or simple, i.e. atomic.

The abstract Simple class (7) has several predefined sub-classes: Number (71), Boolean (72), String (73) and Date (74), but additional custom classes can be defined by extension.

Simple values contain a primitive value of the underlying programming language and are preferably considered immutable. Moreover, two simple instances are considered equal if these have equal primitive values.

The abstract List class (5) represents the value of a multi-valued property and instances of it only exist in this context. The elements of a List (5) must be instances of Element (6). This is an intended limitation and simplification, as for expressing business entities, there's not commonly the need to represent lists of lists, at least, directly nested. Sub-classes of the List class (5) can specify a sub-class of Element (6) as the base class of the elements of the list.

The Complex and the List classes (4, 5) are also commonly called "containers", as these are the ones which can contain other values. Only containers have values as content and, thus, are mutable. Together, containers allow building state hierarchies.

The application programmable interface object (briefly: "API object") of the Complex class (4) is described in Table 1 and that of the List class (5) in Table 2 below which includes predefined and derived methods/actions/commands, such as the act method with starts the execution of the named action. The specific functionality of these methods/commands is further explained in the description column of the tables while the required syntax is provided in the name column, e.g. act requires naming the action, and the data type/return type column indicates the returned type of the action execution or what is done.

TABLE 1

Complex class API.

| Name/Method | Data type/Return type | Description |
|---|---|---|
| get(propName:string) | Instance | Gets the value of a property, given its name. |
| on(actionEventName: string, { <state>: handler }) | — | Attaches an event handler to one or more states of an action execution. |
| act(action: Action) | ActionExecution | Begins the execution of a given action, having this complex object as its target. |
| set(propName:string, value:Instance) | — | Helper method which creates a mutation Replace action message and calls the act method with it. Throws an error if an implicit transaction is created and it is rejected. |
| configure(propSpec: Object) | — | Helper method which creates the required action messages necessary for achieving the given specification state. Executes the actions within a transaction. Throws an error if an implicit transaction is created and it is rejected. |

TABLE 2

List class API.

| Name/Method | Data type/Return type | Description |
|---|---|---|
| count | number | Gets the number of elements in the list. |
| at(index: number) | Element | Gets the element at a given list position. |
| includes(elem: Element) | boolean | Gets a value that indicates if an element is part of the list. |
| indexOf(elem: Element) | number | Gets the index of an element in the list. |
| on(actionEventName: string, { <state>: handler }) | — | Attaches an event handler to one or more states of an action execution. |
| act(action: Action) | ActionExecution | Begins the execution of a given action, having this list object as its target. |
| set(fragment: Element\|Element[ ]) | — | Helper method which creates the minimum required action messages necessary for achieving the given list state. Executes the actions within a transaction. Throws an error if an implicit transaction is created and it is rejected. |
| add(fragment: Element\|Element[ ]) | — | Helper method which creates an Add action message with the given elements and calls the act method with it. Throws an error if an implicit transaction is created and it is rejected. |
| insert(fragment: Element\|Element[ ], index: number) | — | Helper method which creates an Add action message for inserting the given elements at a given position and calls the act method with it. |

TABLE 2-continued

List class API.

| Name/Method | Data type/ Return type | Description |
|---|---|---|
| remove( fragment: Element\|Element[ ]) | — | Throws an error if an implicit transaction is created and it is rejected. Helper method which creates a Remove action message for each of the given elements and calls the act method for each. Throws an error if an implicit transaction is created and it is rejected. |
| removeAt(index: number, count: number) | — | Helper method which creates a Remove action message for each of the elements of a given section of the list and calls the act method for each. Throws an error if an implicit transaction is created and it is rejected. |
| move(elem: Element, toIndex: number) | — | Helper method which creates a Remove action message for removing the given elements and calls the act method with it. Throws an error if an implicit transaction is created and it is rejected. |
| sort(comparer: function) | — | Helper method which creates a Sort action message for sorting the list according with a given comparer function and calls the act method with it. Throws an error if an implicit transaction is created and it is rejected. |
| clear( ) | — | Helper method which creates a Clear action message for removing all elements of a list and calls the act method with it. Throws an error if an implicit transaction is created and it is rejected. |

Actions of the sMVC Architecture

Figure 3:
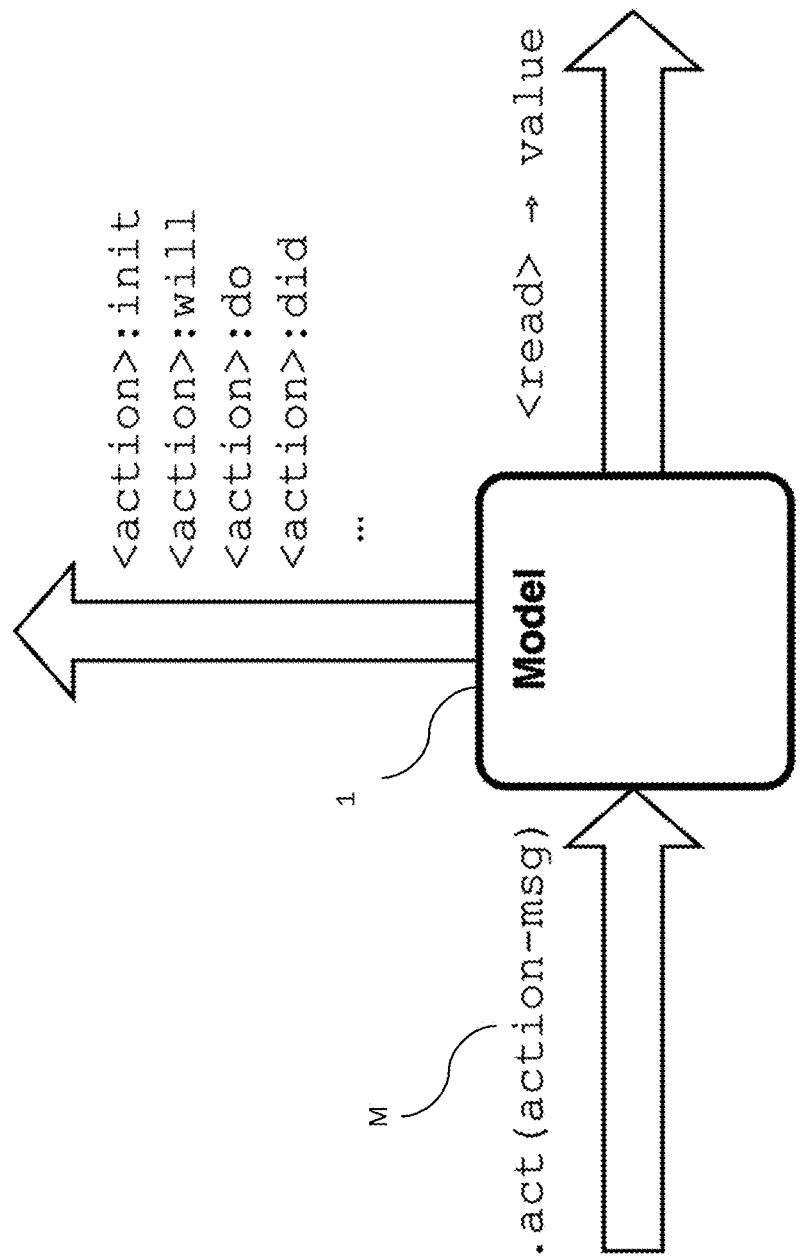
FIG. 3 schematically shows actions, action events and read operations in a model object according to exemplary embodiments.

Now briefly called "Actions" are described in the following. Actions are embodied by action messages or action message objects (M), instances of a class which represents the type of action and whose properties determine the way in which the action is to be performed. An action message (M), either a mutation or a generic one (MA, MG), is sent to a target state container object via its act method (see tables above and see FIG. 3). As briefly described before, execution proceeds according to the common lifecycle and state events (see FIG. 4) are emitted on the target object.

Action Execution Lifecycle of the sMVC Architecture

Figure 4:
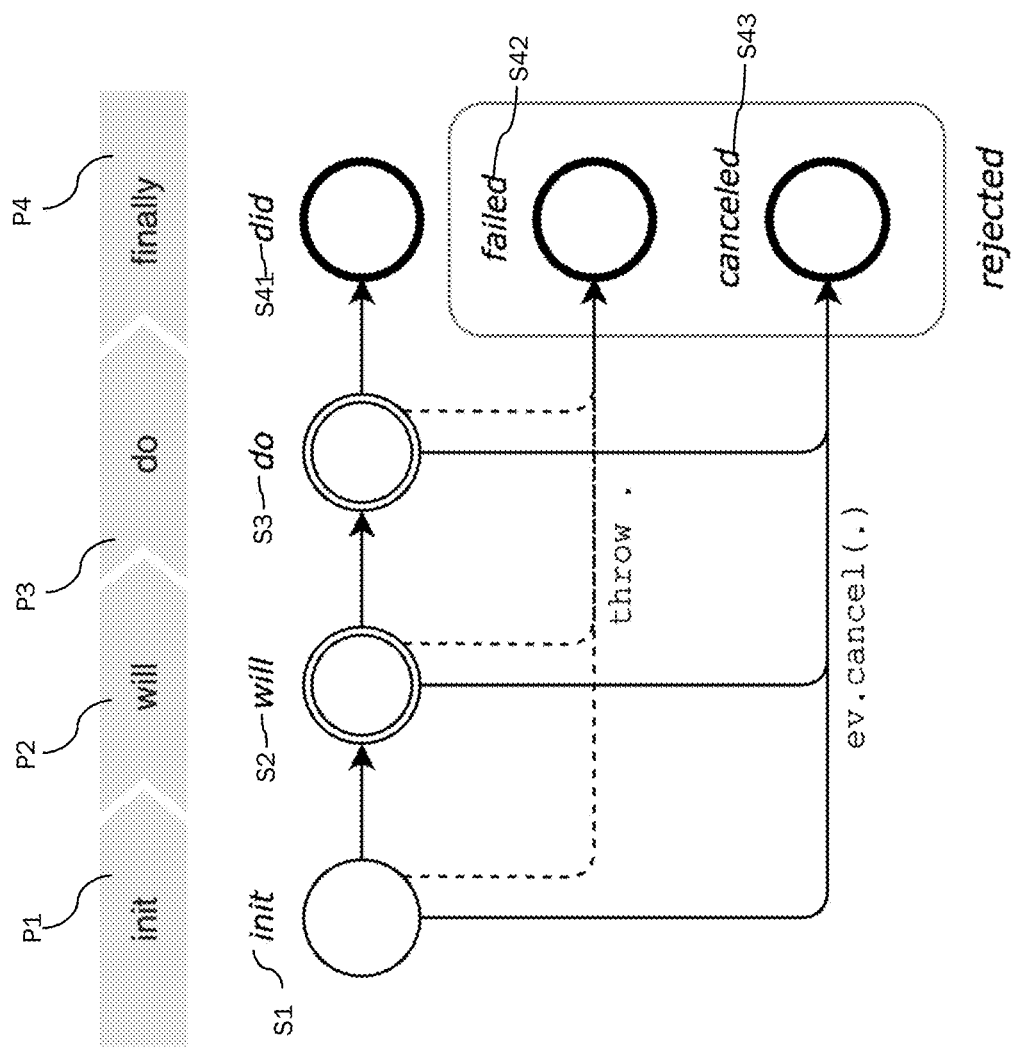
FIG. 4 schematically shows action an execution lifecycle, phases and states thereof according to exemplary embodiments.
Figure 4:
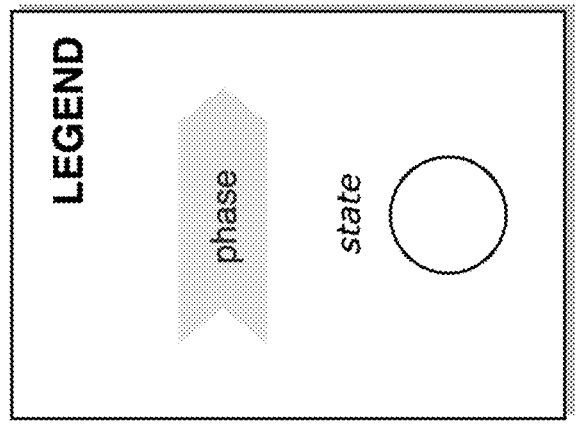

As briefly discussed above, the execution of an action follows a common lifecycle, organized into phases (P1 to P4) and states (S1 to S4), as is illustrated in FIG. 4. Action execution is structured to allow for the coordination of control amongst various controllers (3). As the action execution proceeds, events are emitted on the target object for each reached state. For mutation actions, state events are also emitted on ancestor container objects, due to bubbling. Reading state objects during the execution of mutation actions (MA) reads the final, proposed state.

During the in it phase (P1) a handler object can change exactly what an action is going to do (within the possibilities offered by its writable properties), as well as canceling the action.

Execution proceeds to the will phase (P2). In this phase, the action message (M) is now read-only and what will be done is settled and can no longer be changed. A handler object can now safely cancel an action, based on what will effectively be done. Execution proceeds to the do phase (P3), where the action, proper, is performed. Finally, execution proceeds to the finally phase (P4), where the execution results can be inspected.

In the present disclosure, the execution of an action can be cancelled at any phase preceding the finally phase (P4), in which case execution goes to the cancelled state (S43). Likewise, action execution can fail, for unexpected reasons, in which case execution goes to the failed state (S42). An action is said to have been rejected if it either was cancelled or has failed.

Most actions, and, particularly, mutation actions (MA), are synchronous. However, certain generic actions (MG) can only be performed asynchronously and thus require programming of an asynchronous do phase (P3).

Action Message Classes of the sMVC Architecture

Figure 5:
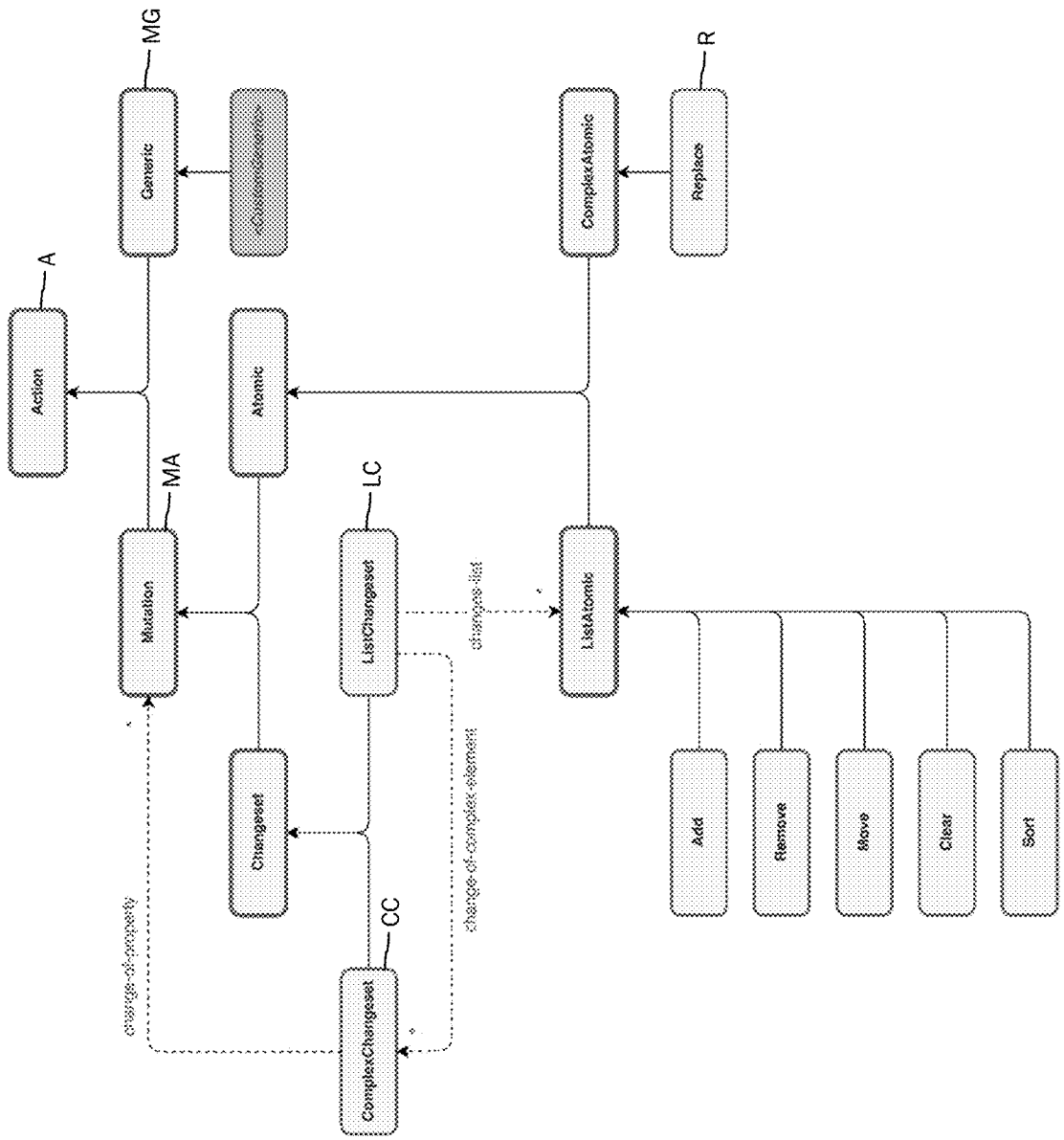
FIG. 5 schematically shows a class hierarchy of action messages according to exemplary embodiments.

The root abstract action message class is Action (A). Its two direct sub-classes are Mutation (MA) and Generic (MG) (see FIG. 5). The sub-classes of the Mutation class (MA) describe the primitive types of mutations that can occur in Complex and List objects (4, 5). These are able to describe any number of mutations which are accumulated in a transaction (T). This and the following explanations are also graphically shown by FIG. 5.

The ComplexChangeset class (CC) contains mutations which are made directly or indirectly to a Complex object (4). For each property, directly or indirectly modified, the relation change-of-property holds a mutation. The type of mutation that it can hold depends on the type of value held by the property and on the changes that have occurred.

If the property is multi-valued, then its value is always the same List instance. However, the list itself (5), as well as the contained elements, when complex, may be mutated. Those mutations are visible through the ListChangeset class (LC). The change-of-property relation can hold an instance of ListChangeset (LC).

If the property is single-valued, then its value may have been replaced by another, including cases where the old or the new value are null. In this case, the change-of-property relation will hold an instance of the Replace class (R). Alternatively, the value that was initially held is complex and has been mutated, in which case the change-of-property relation will hold an instance of the ComplexChangeset class (CC).

The ListChangeset class (LC) contains two types of mutations. The changes-list relation holds the list of mutations made to the list (5) itself, such as added or removed elements, in order of application. The change-of-complex-element relation holds the ComplexChangeset mutations of the currently contained complex elements, if any.

Action Execution Classes of the sMVC Architecture

Figure 6:
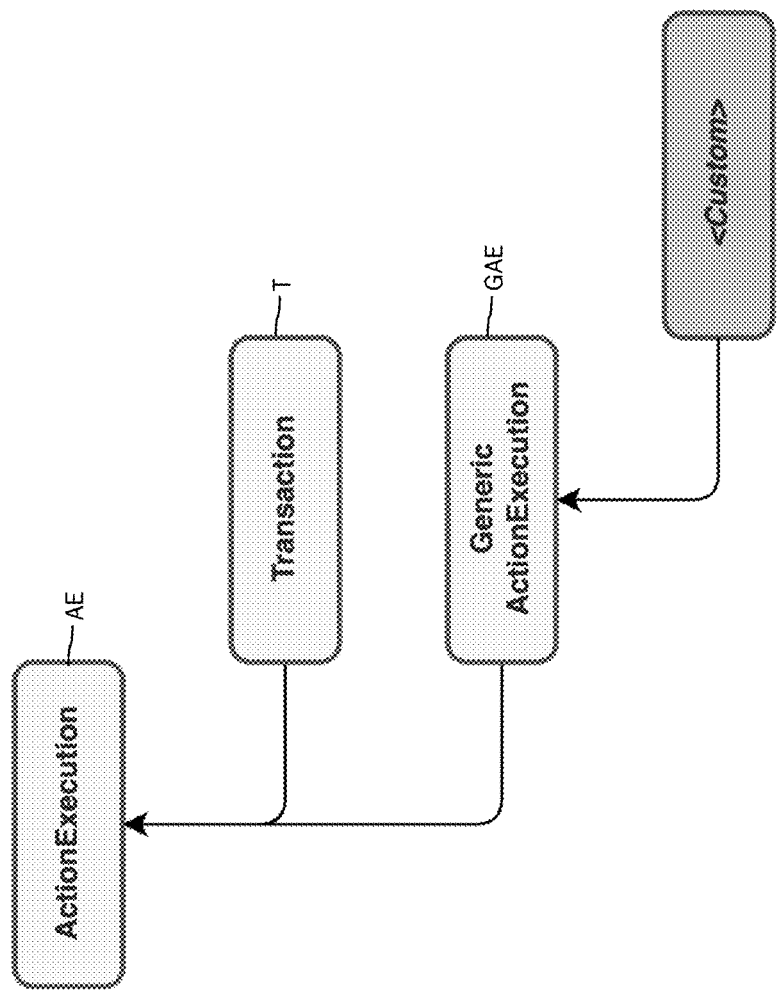
FIG. 6 schematically shows a class hierarchy of action executions according to exemplary embodiments.

The described common action execution lifecycle is enforced by the abstract Action Execution class (AE) (see FIG. 6). The Transaction (T) sub-class implements the specialized execution of a group of Mutation actions (MA). Generic actions (MG) are executed using either the base GenericAction Execution class (GAE) or a custom sub-class of it, as determined by the target object.

The API of the Action Execution class (AE) is described in Table 3, and that of the Transaction class (T), in Table 4. Notice the execute method of the Action Execution class (AE), which actually starts the execution of the associated action. To support asynchronous executions, this method returns a Promise for the completion of the action. Also, notice the static enter method of the Transaction class (T), which allows to explicitly create a transaction, and make it current, to force grouping the execution of subsequent mutations. Mutation messages are added to the current transaction, if one exists, when passed to the act method of the target object. Being an action execution, committing a transaction is naturally done by calling its execute method.

The following details the general procedure followed by the act method of the Complex and List classes (4, 5):

a. If the action argument is an instance of the Mutation class:
  1. Check the current transaction (txn=Transaction.current)
  2. If a current transaction does not exist (txn==null), then, implicitly, create one:
    i. Create a new transaction and set it as current (txn=Transaction.enter( )).
    ii. Add action to the current transaction (achieved through internal implementation code).
    iii. Execute the transaction, and "remove it" from current (txn.execute( ))
    iv. Return the transaction (return txn).
  3. Otherwise
    i. Add action to the current transaction (achieved through internal implementation code).
    ii. Return the transaction (return txn).
b. Otherwise, the action argument is an instance of the Generic class:
  1. If the class of the action argument is known by the target and it has a special sub-class of GenericActionExecution for controlling its execution, use it, otherwise, use the base class.
  2. Construct an instance of the chosen action execution class, passing action as argument (ae=new ChosenGenericActionExecution (action)).
  3. Call the action execution's execute method (ae.execute( )).
  4. Return the action execution (return ae).

Listening to Action Execution Events in the sMVC Architecture

Events are identified by the action event name and the action execution state. The event name of generic actions coincides with the name of the action message class. To handle the will state of a generic action whose class is named Select, the on method would be called like: .on("Select", {will: . . . }). For mutation actions, the event name is always change, whatever the actual action name. The actual type of mutation can be known by reading the class of the action message. So, to handle the in it state of any mutation action, the on method would be called like: .on("change", {init: . . . }). Action event handlers receive a single argument, the action execution instance.

TABLE 3

ActionExecution class API.

| Name/Method | Data type/ Return type | Description |
| --- | --- | --- |
| static isSync | boolean | Indicates if the action execution is synchronous or asynchronous. |
| action | Action | Gets the message of the action being executed. |
| state | string | Gets the name of the current state of the action execution. |
| error | ? Error | Gets the cancelation reason error or the failure error. |
| promise | Promise | Gets a promise for the completion of the action execution. |
| execute( ) | Promise | Begins the execution. |
| reject(error: Error) | — | Cancels or fails the execution, depending on the class of the specified error object. |

TABLE 4

Transaction class API.

| Name/Method | Data type/ Return type | Description |
| --- | --- | --- |
| static enter( ) | Transaction | Creates a new transaction and makes it the current transaction. |
| static current | ? Transaction | The current transaction, if any. |
| isCurrent | boolean | Indicates if the transaction is the current, ambient transaction. |
| exit( ) | — | Stops this transaction from being the current transaction. |

View/User Interface of the sMVC Architecture

A View (2) creates a visual (or graphical or any other) representation of its associated model (1), suitable for consumption by the user of the software application. A view (3) can also create representations of state which stimulate human senses other than the visual sense. A view (2) is also responsible for interpreting the gestures targeted at its state representation and translating these into corresponding action message executions, targeting the model (1).

Typically, a UI application has a single root view (2), associated with a single root model (1), the state store of the sMVC architecture. However, note that the herein-described model(s) (1) is/are a hierarchical data structure, composed of sub-models and/or sub-data. When a single view (2) represents the hierarchy of models (1) extending from its associated (root) model (1), then the view (2) effectively represents more than one model (1). The view (2) is free to (a) listen to change events only at the root model (1) and to benefit from bubbling to become aware of changes to sub-models or to (b) listen to events directly on the sub-models. Naturally, these strategies can also be combined. Actions messages (M) should be targeted at the involved sub-model.

Views (2) can also be composed herein. Typically, view (2) composition mirrors the hierarchical structure of a model (1) and each view (1) becomes responsible for rendering a sub-tree (which reflects the hierarchical structure) of the root model (2).

An extensible UI application may support views (2) being provided by third parties, via plugin modules, by complying with a specified view contract or API object. Among other things, the view contract necessarily associates a view instance with a model instance of a certain sub-class of a model (1). Another factor, for both extensibility and composability, is that views ultimately render to a common primitive graphical language (for example, a View of a web application could be required to render to a DOM technology such as HTML, SVG or WebGL). Additionally, it can be possible to mix views (2) which employ different rendering paradigms (see below).

Very preferably, to facilitate the adoption of a software application and speed up the growth of its plugin ecosystem, the view contract and the exposed model (1) make it easy for views (2) to be implemented using a great variety of compatible rendering technologies and graphical libraries.

The rendering paradigms can be classified according to the granularity of the rendering operations which are made in response to state changes. The total rendering paradigm is such that a UI is totally reconstructed whenever any part of the state changes. The partial rendering paradigm is such that only the parts of a UI which actually represent the changed state are updated. It is noted that the possible inferiority of the total paradigm can be mitigated by performing the total rendering against virtual graphical elements, which are generally cheaper to operate, and then by comparing these with the current virtual graphical elements. Only the parts which differ are actually updated in the real UI.

The proposed state store of the sMVC architecture plays well with either of these paradigms. A total rendering view (2) reads the whole state from its model (1), when reacting to state changes, whatever the scope of the change. A partial rendering view (2) analyzes the mutation action messages of state change events to determine the minimal part of the UI that needs updating.

Controller/Behavior and Business Logic of the sMVC Architecture

A controller (3) exerts control on a model (1) by listening to the lifecycle state events that the model (1) emits to reflect the actions that execute in it according to the sMVC architecture. Typically, the UI application acts as the main controller of its single root model (1) (and of all of the contained sub-models), the state store. Control may also be delegated to third parties, by allowing these to register listener objects for lifecycle state events of the software application's state store. This enables third parties to override or complement the base behavior and business logic.

Exerting control frequently results in the mutation of state. Just like with rendering paradigms, state mutation can be classified as being total or partial. The total state mutation paradigm, in which a controller (3) specifies the whole, desired, final state, even if only a small part of the state is known to have changed, and, the partial state mutation paradigm, in which a controller (3) specifies only the parts of the state which actually change. Again, the proposed state store may be configured to use either of these paradigms.

FIG. 7 shows a computer system which implements the sMVC architecture by way of one possible example. It shows a plurality of client computers 100-2 and 100-2. It is noted that only a single client computer may be used and also more than two client computers 100 may be used. The client computers are communicably connected or connectable to a network or network system 200. The client computers may be realized as desktop computers, notebook computers, tablet computers, etc. Furthermore, a client computer may be realized by any device configured to run computer applications and connecting over a network by wired and/or wireless network connection. That is, client computers may be realized also as stationary workstations or as mobile devices such as e.g. smartphones or the like. The client computer 100-1 (same for 100-2) may include one or more monitors or any other display device one or more internal processors 102-1 and/or one or more internal memory units 103-1. Further, it may be connected for transmission of data and/or electrical power with a keyboard 104-1 and/or a pointer device 105-1, such as a computer mouse or the like.

The network 200 can be realized by a global and/or public network, such as the internet, or the network 200 can be realized also as a wired or wireless private, local or regional network, such as a LAN, a WLAN or other. Each single client computer 100-2 may be connected to the network 200 by a separate connection which are shown by bold black lines in FIG. 7.

In some exemplary embodiments, one or more servers 300-1, 300-2, 300-3 (more or less than three servers is possible) may store the sMVC architecture in their internal storage units (which are not shown in the FIG. 7). The sMVC architecture may include, e.g. for the views, icon files, view files, etc. Further, it may include, e.g. for the model, model process data units including different kinds of variables and the like.

In some exemplary embodiments, the server 300 may be a single server or a system of multiple servers interacting with each other or serving different services individually.

Exemplarily, the client computers 100 and/or the servers 300 may further communicably connect to a database system (not shown) to obtain data such as external data, analysis data, data sources, etc. For example, software applications running on client computers 100 and/or the servers 300 may obtain data from the database system.

In one example of the herein described disclosure, a client computer 100 detects an input from a user, e.g. by clicking the mouse or entering a key into the keyboard. This may result in an interaction between an associated model and the view as well as an interaction between a model and a controller, as shown by the large arrows in FIG. 1. As a result of the interactions, a modification of the view may be displayed to the user. Depending on where the different units, such as the models, the views and the controllers are located in the system of FIG. 7, data communication between the network 200 and the client computers 100 as well as between the network 200 and the servers 300 may take place. For example, if the servers 300 host the sMVC architecture, the user interaction with the client computer 100 may lead to data exchange from the client computer 100 to the network 200 which passes the request to a/the server 300. There, the request is handled and the result thereof is displayed to the user on the monitor 101 of the client computer 100. Of course, the architecture may also be stored locally so that a data connection with a network 200 or a server 300 could be omitted. Other system designs than the one shown by FIG. 7 are possible, e.g. by varying the number of units, such as client computers, servers, networks, databases, etc., or by varying the data connections between units of the system or the like.

Summarizing, this disclosure includes, as a technical improvement, a combination of at least some of the following characteristics, adding up to a clean and effective (sMVC) architecture for extensible UI software applications:

a. A hierarchical, object-oriented state store, taking advantage of:
      1. inheritance and polymorphism—for concise and expressive state and behavior representations;
      2. natural object distribution—for decentralized, modular, composable and extensible management of state.
   b. A uniform representation of actions that unifies mutation and generic actions.
   c. A common lifecycle for the execution of actions.
   d. The ability of control delegation and coordination, supported by the order and semantics imposed by the action execution lifecycle, and by application and third-party state event listener objects.
   e. The ability of determining a sequence of mutation actions which achieves a desired internal state.
   f. The ability of grouping the execution of multiple mutation actions, through transactions.
   g. The ability of representation of "change hierarchies", in mutation action execution events, enabling "change analysis" by Controllers and Views at any level of detail.
   h. The ability of the state store to be an adapter hub for Controllers and Views of different technologies, and which use different state management and rendering paradigms.

As will be appreciated by one of skill in the art, the present disclosure, as described hereinabove and the accompanying figures, may be embodied as a method (e.g., a computer-implemented process or any other process), apparatus (including a device, machine, system, computer program product, and/or any other apparatus), or a combination of the foregoing. The objects, API, and other parts/components of the herein described sMVC architecture are preferably programmed in a programming language so that the above described properties, behavior, functionalities, can be achieved.

Accordingly, embodiments of the present disclosure may take the form of an entirely software embodiment (including firmware, resident software, micro-code, etc.), or an embodiment combining software and hardware aspects that may generally be referred to herein as a "system". Furthermore, embodiments of the present disclosure may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Embodiments of the present disclosure are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, create means for implementing the functions/acts/outputs specified in the flowchart, block diagram block or blocks, figures, and/or written description.

The computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the disclosure.

It should be noted that terms such as "server" and "processor" may be used herein to describe devices that may be used in certain embodiments of the present disclosure and should not be construed to limit the present disclosure to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium.

Unless the context otherwise requires, the present disclosure should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the disclosure, and should not be construed to limit the present disclosure to any particular logic flow or logic implementation. The described logic may be partitioned into different logic blocks (e.g., programs, modules, functions, or subroutines) without changing the overall results or otherwise departing from the true scope of the disclosure.

Often, logic elements may be added, modified, omitted, performed in a different order, or implemented using different logic constructs (e.g., logic gates, looping primitives, conditional logic, and other logic constructs) without changing the overall results or otherwise departing from the true scope of the disclosure.

The present disclosure may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, JavaScript or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), pre-loaded with a computer system (e.g., on system ROM or fixed disk), or distributed from a server or electronic bulletin board over the communication system (e.g., the Internet or World Wide Web). Of course, some embodiments of the disclosure may be implemented as a combination of both software (e.g., a computer program product) and hardware. Still other embodiments of the disclosure are implemented as entirely hardware, or entirely software.

While certain exemplary embodiments have been described and shown in the accompanying drawings, it is to be understood that such embodiments are merely illustrative of and are not restrictive on the broad disclosure, and that the embodiments of disclosure are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the disclosure. Therefore, it is to be understood that, within the scope of the appended claims, the disclosure may be practiced other than as specifically described herein. For example, unless expressly stated otherwise, the steps of processes described herein may be performed in orders different from those described herein and one or more steps may be combined, split, or performed simultaneously.

Those skilled in the art will also appreciate, in view of this disclosure, that different embodiments of the disclosure described herein may be combined to form other embodiments of the disclosure.

REFERENCE SIGNS

1: Model (object)
2: View (object)
3: Controller (object)
4: complex data class
5: list data class
6: Element class
7: (abstract) simple class
71: Number element
72: Boolean element
73: String element
74: Date element
A: Action Class
MG: Generic Action (Class)
MA: Mutation Action (Class)
CC: ComplexChangeset Class
LC: ListChangeset Class
R: Replace
AE: Action Execution Class
T: Transaction
GAE: GenericActionExecution Class
100 (100-1, 100-2): Client Computer/Computer
101(101-1, 101-2): Display/Monitor
102 (102-1, 102-2): Processor
103 (103-1, 103-2): Internal memory
104 (104-1, 104-2): Keyboard
105 (105-1, 105-2): Pointer device
200: Network
300 (300-1, 300-2, 300-3): Server
P1: action execution phase "init"
P2: action execution phase "will"
P3: action execution phase "do"
P4: action execution phase "finally"
S1: state "init"
S2: state "will"
S3: state "do"
S41: state "did"
S42: state "failed"
S43: state "canceled"
M: Action message

The invention claimed is:

1. A non-transitory computer readable storage medium storing thereon a computer program product comprising computer-readable instructions that, when executed in a computer system including one or more computers, cause the computer system to generate or update a user interface of a software application, the computer program product including programmably interconnected objects, said objects comprising one or more model objects, one or more view objects, and one or more controller objects, wherein each model object is interconnected for data exchange with one or more view objects and with one or more controller objects; and each model object includes one or more sub-data objects and one or more sub-model objects including hierarchically structured data and representing a state of the user interface;

each view object is associated with at least one model object or at least one sub-model object and configured to generate the user interface or update the user interface in accordance with a change of the state; and each controller object is associated with at least one model object or at least one sub-model object and configured to execute control of said associated model object or sub-model object, wherein the programmably interconnected objects provide an interface, between the objects, which links them by way of programmed code.

2. The non-transitory computer readable storage medium of claim 1, wherein the data exchange between a view object and a model object is unidirectional.

3. The non-transitory computer readable storage medium of claim 1, wherein the data of the model object is hierarchically structured according to different data classes, either a complex data class which represents a structured value with zero, one or multiple properties or a list data class which combines zero, one or more data elements.

4. The non-transitory computer readable storage medium of claim 3, wherein the model objects, the view objects and the controller objects are interconnected by application programmable interface (API) object which includes predefined action messages or action executions.

5. The non-transitory computer readable storage medium of claim 4, wherein
action messages are structured into sub classes including mutation actions and generic actions, wherein a mutation action is configured to execute changes to a target sub model object or a model object, and to sub model objects or model objects which are interrelated with the target sub model object or model object, and
wherein multiple mutation actions are executable at the same time as a transaction.

6. The non-transitory computer readable storage medium of claim 5, wherein generic actions has a custom semantics and can have an asynchronous "do" phase.

7. The non-transitory computer readable storage medium of claim 5, wherein mutation actions and generic actions may be handled uniformly using a common entry-point, a base execution life-cycle or execution "state" listening capabilities.

8. The non-transitory computer readable storage medium of claim 1, wherein
a model object which has received an action message from the associated view object or controller object is configured to execute a requested action in accordance with the action message following a predefined order of action execution phases, wherein
the first action execution phase is "init", the second action execution phase is "will", the third action execution phase is "do" and the fourth action execution phase is "finally".

9. The non-transitory computer readable storage medium of claim 8, wherein
the execution of the requested action follows the predefined order of action execution phases, wherein during the "init"-phase the execution of the requested action can be at least changed or the requested action can be cancelled, during the "will"-phase, at least, it is validated as to whether the required action is executable and the requested action is cancelled if not, during the "do"-phase the required action is executed or can be cancelled, and during the "did"-phase the execution results are processable; and
wherein the model object executing the required action is configured to emit a state-notification to the associated one or more controllers or one or more views.

10. The non-transitory computer readable storage medium of claim 1, wherein
the view objects are configured to apply a common graphical programming language, and
each view object is configured to either generate the entire user interface upon a state change or to update a part of the user interface upon a state change.

11. The non-transitory computer readable storage medium of claim 1, wherein
the controller objects include listener objects configured to listen to state-notifications emitted by an associated model object, and
the control objects are configured to specify either an entire final state of a mutation action or a part of the final state of a mutation action.

* * * * *